United States Patent Office 2,807,576
Patented Sept. 24, 1957

2,807,576
BRIGHT SILVER PLATING

Otto Kardos, Red Bank, N. J., assignor to Hanson-Van Winkle-Munning Company, a corporation of New Jersey No Drawing. Application January 18, 1955,
Serial No. 482,662

8 Claims. (Cl. 204—46)

This invention relates to silver plating and more particularly to the electrodeposition of bright silver deposits from silver cyanide plating baths.

In my U. S. Patent No. 2,666,738, granted January 19, 1954, I have described and claimed a process for producing bright silver electrodeposits from an aqueous silver cyanide plating bath by employing as an addition agent an alkali-soluble reaction product of carbon disulfide, an alkali hydroxide, and a ketone of the formula $R^0CH_2COCH_3$, where $R^0$ is a substituent selected from the group consisting of hydrogen, alkyl, acetonyl and alkali metal carboxymethyl.

I have now discovered that very satisfactory bright silver electrodeposits may be produced from plating baths in which the brightening agent is the reaction product of carbon disulfide, an alkali metal hydroxide, and a ketone of the formula $RCH_2COCH_2R'$, where neither R nor R' is hydrogen, but is a substituent selected from the group consisting of alkyl, alkenyl, aryl, and alkali metal carboxymethyl (especially —$CH_2COONa$ and —$CH_2COOK$) radicals. As with the brightening agents described in my aforesaid patent, these ketone-carbon disulfide reaction products cooperate very strongly with small amounts of Turkey red oil (sulfonated castor oil) in the cyanide plating bath. In many cases the brightest deposits, and broadest current density ranges over which bright deposits form, result from the concomitant use of the ketone-carbon disulfide reaction product and Turkey red oil.

Apitzsch (Ber. 37, 1599 (1904); 38, 2888 (1905) and 41, 4028 (1908)) described the general reaction of the ketonic group —$CH_2COCH_2$— with carbon disulfide and alkali hydroxide as yielding 2,6 dithiols (2,6 dithiones on acidification) of 1,4 thiapyrone (compare R. C. Elderfield, Heterocyclic Compounds, vol. I, p. 396, John Wiley & Sons, N. Y.). The reaction products which are used in accordance with this invention as silver brighteners are prepared by the Apitzsch method. As precipitated by acidification they appear to conform to the general formula

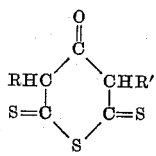

For the utilization of these reaction products as silver brighteners, it is very important that alkali metal sulfide (or hydrosulfide) formed concurrently with them be completely eliminated before their addition to the silver plating bath. This is done by acidifying the end product of the reaction with mineral acid, whereby the ketone-carbon disulfide reaction product precipitates and hydrogen sulfide is formed. The precipitate is then thoroughly washed with water, redissolved in dilute aqueous sodium hydroxide and reprecipitated with acid. This purification of the reaction product by dissolution in dilute aqueous sodium hydroxide and precipitation with mineral acid can be repeated several times. The final product can be dried in vacuo and powdered. Weaker acids, such as acetic acid, do not precipitate these reaction products. However, after treating a solution of the reaction product with such acid and boiling away the hydrogen sulfide, solutions thus freed from undesired sulfides can also be used as silver brighteners.

A satisfactory formula for an aqueous silver bath is:

| | Oz./gal. |
|---|---|
| Silver cyanide | 8.0 |
| Potassium cyanide | 18.0 |
| Potassium carbonate | 6.0 |

Obviously this is but one example of many possible bath formulations. The silver cyanide may range from 6 oz./gal. up, the practical maximum concentration (due to economic consideration) being usually about 10 oz./gal. The free potassium cyanide concentration generally extends from about 12 oz./gal. to about 15 oz./gal. Potassium carbonate is not an essential ingredient of the bath, and therefore its concentration may range from none at all to 12 oz./gal. Potassium hydroxide may be present in a small amount not exceeding 0.4 oz./gal., but preferably it is omitted altogether. While these are preferred ranges and compositions for silver cyanide plating baths in which the brighteners of this invention may be used, the composition of the bath is not critical to successful use of the brightener.

The ketone-carbon disulfide reaction product is preferably employed in the plating bath in a concentration of from 0.01 to 0.16 oz./gal. (0.075 to 1.25 g./l. Within this range, I have had very satisfactory results using 0.04 to 0.08 oz./gal. (0.30 to 0.60 g./l.) of the reaction product. The Turkey red oil is most advantageously used as a commercial 50% solution, of which it is best to use from 0.4 to 1.6 ml./l. of the plating bath. While best results are generally obtained when the ketone reaction product brightener and the Turkey red oil are used in concentrations that fall within these limits, some departure therefrom is possible without losing the benefits of the invention.

When the Turkey red oil is used, it not only contributes to enhanced brighteners of the deposit, but also increases the current density range over which bright deposits are formed. It should be recorded that some of the ketone-carbon disulfide reaction products produce satisfactory bright silver electrodeposits over at least a limited current density range, even in absence of Turkey red oil, and that all ketone-carbon disulfide reaction products produce, in the absence of Turkey red oil, at least semi-bright silver electrodeposits in an unagitated bath; their brightness was strongly increased by agitation. However, in order to obtain maximum brightness, the addition of 0.6 to 1.2 ml./l. of Turkey red oil (50%) to the silver plating bath is generally desirable.

As stated above, the brightener used is the reaction product prepared from a ketone having the general formula $RCH_2COCH_2R'$, where R is a substituent selected from the group consisting of alkyl, alkenyl, aryl, and alkali metal carboxymethyl radicals, and where R' likewise is a substituent selected from that group. In general, R and R' are different substituents; but I have found that for commercial purposes it is often especially desirable for the ketone used in making the reaction product to be a symmetrical compound in which R and R' are the same. In such case the general formula of the ketone becomes $RCH_2COCH_2R$, where R is one of the specified substituents.

Example 1

A mixture of diethylketone (3-pentanone) in the amount of 17.2 grams (0.2 mol) and carbon disulfide in the amount of 30.4 grams (0.4 mol) was added to 70 grams of freshly powdered potassium hydroxide contained in a flask equipped with a reflux condenser. After an induction period of about 30 minutes the mixture became warm and darkened progressively. After 2 hours it was a dark brown, solid mass. This was dissolved in water, extracted with ether in a separating funnel, and the aqueous layer acidified with dilute hydrochloric acid. The dark brown precipitate was filtered, washed with water, and redissolved in dilute sodium hydroxide. The solution was filtered, and the reaction product was reprecipitated from the filtrate with dilute hydrochloric acid. After washing and drying, the orange colored purified reaction product was used as a silver brightener (in the form of a dilute solution in potassium hydroxide).

Addition of 0.075 to 1.25 g./l. (0.01 to 0.16 oz./gal.) of the diethylketone-carbon disulfide reaction product to a silver cyanide plating bath as described above resulted in the production of bright areas over a somewhat limited current density range on Hull cell panels. Upon addition to the plating bath containing this reaction product of 0.4 to 1.6 ml./l. of an aqueous solution of Turkey red oil (sulfonated castor oil), 50%, the bright current density range was widened, extending from 1 to about 15 amperes per square foot. The current density range over which deposits of maximum brighteners were formed also was increased by such steps as agitation of the bath, increasing the bath temperature (e. g. to 30 to 40° C.), increasing the silver concentration, and adding 6 to 12 oz./gal. of potassium nitrate to the bath.

Example 2

A mixture of diisobutylketone in the amount of 28.4 grams (0.2 mol) and carbon disulfide in the amount of 30.4 grams (0.4 mol) was added to 70 grams of freshly powdered potassium hydroxide contained in a flask provided with a reflux condenser. In contrast to Example 1, the mixture required external heating in order to make the reaction proceed. After 4 hours of heating on a water bath the reaction product was precipitated and purified as in Example 1. The final product was of a more resinous type and the yield small.

Addition of 0.075 to 1.25 g./l. (0.01 to 0.16 oz./gal.) to a standard silver bath as described above produced bright silver deposits over a somewhat limited current density range. When 0.4 to 1.6 ml./l. of Turkey red oil, 50%, were added to the bath, still brighter silver electrodeposits were obtained, and over a wider current density range.

Example 3

A mixture of 25 grams of dibenzyl ketone (1.3 diphenyl-2-propanone) and 50 ml. of carbon disulfide was added to 55 grams of freshly powdered potassium hydroxide contained in a flask equipped with a reflux condenser. As the flask had not been dried, some water was present, as prescribed by Apitzsch (Ber. 37, 1599, 1904). Surprisingly, strong reaction set in at once and after about 20 minutes the reaction mass was heated for 30 more minutes on a water bath. After cooling, water was added and the excess carbon disulfide eliminated in a separation funnel. The aqueous solution was extracted with ether, and after discard of the ethereal layer it was acidified with dilute hydrochloric acid. The precipitate which formed was collected and then redissolved in sodium hydroxide and reprecipitated with acid.

The final reaction product proved to be an effective brightener in standard silver cyanide plating baths as described above, especially when used in concentrations of about 0.16 to 0.64 g./l. and when used together with 0.8 ml./l. of Turkey red oil, 50%.

Example 4

Gamma keto-pimelic acid (4-keto heptanoic acid), (HOOCCH$_2$CH$_2$)$_2$CO was prepared from furan acrylic acid (as described by F. G. Singleton in U. S. Patent No. 2,436,532, granted February 24, 1948). Eight grams of this keto-pimelic acid were suspended (and apparently partly dissolved) in 75 ml. of carbon disulfide and this mixture was poured over 50 grams of freshly powdered potassium hydroxide contained in a flask provided with a reflux condenser. No reaction occurred thus, but when 5 ml. of water were added, exothermic reaction and darkening of the potassium hydroxide began. Finally the mixture was heated on a water bath for 1 hour under reflux. After cooling, about 300 ml. of water were added to dissolve the reacted and unreacted potassium hydroxide. In a separation funnel first the excess carbon disulfide and then an ethereal extract of the aqueous layer were eliminated. The residual aqueous layer was acidulated with dilute hydrochloric acid, and after standing overnight a brown precipitate fell out. This precipitate was redissolved in dilute alkali hydroxide, and after filtration it was reprecipitated with dilute hydrochloric acid. When 0.075 to 1.25 g./l. of the dried product was added to a standard silver cyanide plating bath of the character described above, it gave fairly bright silver deposits over a rather limited range of current densities on a Hull cell panel. The intensity of brightness and the current density range of brightness both were considerably improved by concomitant use in the plating bath of 0.4 to 1.6 ml./l. of Turkey red oil (50%).

The foregoing examples are merely illustrative of the great number of ketones of the general formula

RCH$_2$COCH$_2$R′ as specified above, which can be used to prepare reaction products capable of functioning as brightening agents in silver cyanide plating baths. Thus, in addition to the ketones of the foregoing examples, ethyl allyl ketone, ethyl propyl ketone, ethyl butyl ketone, dipropyl ketone, dibutyl ketone, ethyl benzyl ketone, and ethyl isopropyl ketone will undergo typical Apitzsch reactions and yield products which are effective as silver brighteners in accordance with this invention.

I claim:

1. A process for producing bright silver electrodeposits, which comprises electrodepositing silver from an aqueous cyanide silver plating bath containing 0.01 to 0.16 oz./gal. (0.075 to 1.25 g./l.) of the water- and acid-insoluble but alkali-soluble reaction product of a ketone of the formula RCH$_2$COCH$_2$R′, where R and R′ are substituents selected from the group consisting of alkenyl, aryl, and alkali metal carboxymethyl, with carbon disulfide and alkali hydroxide, this reaction product having been freed from alkali sulfide and hydrogen sulfide.

2. A process for producing bright silver electrodeposits, which comprises electrodepositing silver from an aqueous cyanide silver plating bath containing 0.4 to 1.6 ml./l. of an aqueous solution of Turkey red oil, 50%, and 0.01 to 0.16 oz./gal. (0.075 to 1.25 g./l.) of the water- and acid-insoluble but alkali-soluble reaction product of a ketone of the formula RCH$_2$COCH$_2$R′, where R and R′ are substituents selected from the group consisting of alkenyl, aryl, and alkali metal carboxymethyl, with carbon disulfide and alkali hydroxide, this reaction product having been precipitated by addition of a strong mineral acid and freed from alkali sulfide and hydrogen sulfide.

3. A process for producing bright silver electrodeposits, which comprises electrodepositing silver from an aqueous cyanide silver plating bath containing 0.04 to 0.08 oz./gal. (0.30 to 0.60 g./l.) of the water- and acid-insoluble but alkali-soluble reaction product of a ketone of the formula RCH$_2$COCH$_2$R′, where R and R′ are substituents selected from the group consisting of alkenyl, aryl, and alkali metal carboxymethyl, with substantially two mols of carbon disulfide per mol of carbonyl group and at least one and a half mols of alkali hydroxide per mol of carbon disulfide, this reaction product having been freed from alkali sulfide and hydrogen sulfide.

4. A process for producing bright silver electrodeposits, which comprises electrodepositing silver from an aqueous cyanide silver plating bath containing 0.4 to 1.6 ml./l. of an aqueous solution of Turkey red oil, 50%, and 0.04 to 0.08 oz./gal. (0.30 to 0.60 g./l.) of the water- and acid-insoluble but alkali-soluble reaction product of a ketone of the formula $RCH_2COCH_2R'$, where R and R' are substituents selected from the group consisting of alkenyl, aryl, and alkali metal carboxymethyl, with substantially two mols of carbon disulfide per mol of carbonyl group and at least one and a half mols of alkali hydroxide per mol of carbon disulfide, this reaction product having been precipitated by addition of a strong mineral acid and freed from alkali sulfide and hydrogen sulfide.

5. A process for producing bright silver electrodeposits, which comprises electrodepositing silver from an aqueous cyanide silver plating bath containing 0.01 to 0.16 oz./gal. (0.075 to 1.25 g./l.) of the water- and acid-insoluble but alkali-soluble reaction product of a ketone of the formula $RCH_2COCH_2R$, where R is a substituent selected from the group consisting of alkenyl, aryl, and alkali metal carboxymethyl, with carbon disulfide and alkali metal hydroxide, this reaction product having been freed from alkali metal sulfide and hydrogen sulfide.

6. A process for producing bright silver electrodeposits which comprises electrodepositing silver from an aqueous cyanide silver plating bath containing 0.4 to 1.6 ml./l. of an aqueous solution of Turkey red oil, 50%, and 0.01 to 0.16 oz./gal. (0.075 to 1.25 g./l.) of the water- and acid-insoluble but alkali-soluble reaction product of a ketone of the formula $RCH_2COCH_2R$, where R is a substituent selected from the group consisting of alkenyl, aryl, and alkali metal carboxymethyl, with carbon disulfide and alkali metal hydroxide, this reaction product having been precipitated by addition of a strong mineral acid and freed from alkali metal sulfide and hydrogen sulfide.

7. A process for producing bright silver electrodeposits, which comprises electrodepositing silver from an aqueous cyanide silver plating bath containing 0.04 to 0.08 oz./gal. (0.30 to 0.60 g./l.) of the water- and acid-insoluble but alkali-soluble reaction product of a ketone of the formula $RCH_2COCH_2R$, where R is a substituent selected from the group consisting of alkenyl, aryl, and alkali metal carboxymethyl, with substantially two mols of carbon disulfide per mol of carbonyl group and at least one and a half mols of alkali hydroxide per mol of carbon disulfide, this reaction product having been freed from alkali sulfide and hydrogen sulfide.

8. A process for producing bright silver electrodeposits, which comprises electrodepositing silver from an equeous cyanide silver plating bath containing 0.4 to 1.6 ml./l. of an aqueous solution of Turkey red oil, 50%, and 0.04 to 0.08 oz./gal. (0.30 to 0.60 g./l.) of water- and acid-insoluble but alkali-soluble reaction product of a ketone of the formula $RCH_2COCH_2R$, where R is a substituent selected from the group consisting of alkenyl, aryl, and alkali metal carboxymethyl, with substantially two mols of carbon disulfide per mol of carbonyl group and at least one and a half mols of alkali hydroxide per mol of carbon disulfide, this reaction product having been precipitated by addition of a strong mineral acid and freed from alkali sulfide and hydrogen sulfide.

References Cited in the file of this patent

UNITED STATES PATENTS 2,666,738    Kardos  ---------------- Jan. 19, 1954